(12) United States Patent
Dutruc

(10) Patent No.: US 10,712,424 B2
(45) Date of Patent: Jul. 14, 2020

(54) GEOLOCATION SYSTEM, AND AN ASSOCIATED AIRCRAFT AND GEOLOCATION METHOD

(71) Applicant: AIRBUS HELICOPTERS, Marignane (FR)

(72) Inventor: Herve Dutruc, Ensues la Redonne (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 16/289,965

(22) Filed: Mar. 1, 2019

(65) Prior Publication Data
US 2019/0271759 A1 Sep. 5, 2019

(30) Foreign Application Priority Data

Mar. 1, 2018 (FR) ..................... 18 70221

(51) Int. Cl.
| | |
|---|---|
| *G01S 5/08* | (2006.01) |
| *G01S 5/02* | (2010.01) |
| *H01Q 3/02* | (2006.01) |
| *G01S 3/04* | (2006.01) |
| *B64C 39/02* | (2006.01) |

(52) U.S. Cl.
CPC ............... *G01S 5/08* (2013.01); *G01S 3/043* (2013.01); *G01S 5/0221* (2013.01); *G01S 5/0226* (2013.01); *H01Q 3/02* (2013.01); *B64C 39/024* (2013.01); *B64C 2201/141* (2013.01)

(58) Field of Classification Search
CPC . G01S 1/02; G01S 3/043; G01S 3/065; G01S 5/04; G01S 5/08; G01S 5/0221; G01S 5/0226; H01Q 3/02; H01Q 7/00

USPC .......................................................... 342/449
See application file for complete search history.

(56) References Cited

U.S. PATENT DOCUMENTS

| | | | |
|---|---|---|---|
| 2007/0210976 A1* | 9/2007 | Luk ......................... | H01Q 21/24 343/793 |
| 2015/0130664 A1 | 5/2015 | Hill et al. | |
| 2016/0018509 A1 | 1/2016 | Mccorkle | |
| 2017/0199269 A1 | 7/2017 | Allen et al. | |
| 2018/0024220 A1* | 1/2018 | Massarella ................ | G01S 3/26 342/417 |

FOREIGN PATENT DOCUMENTS

WO         2004027446 A1     4/2004

OTHER PUBLICATIONS

French Search Report for FR 1870221, Completed by the French Patent Office, dated Dec. 19, 2018, All together 7 Pages.

* cited by examiner

*Primary Examiner* — Harry K Liu
(74) *Attorney, Agent, or Firm* — Brooks Kushman P.C.

(57) ABSTRACT

An aircraft, to a system, and to a method of geolocation for calculating the current coordinates at least in longitude and in latitude of a current position of an aircraft. Such an invention makes it possible to calculate the current coordinates in latitude and in longitude corresponding to the current position of the aircraft on the basis firstly of first and second coordinates in latitude and in longitude of two ground stations and secondly of first and second transmission directions of the radio signals.

14 Claims, 2 Drawing Sheets

GEOLOCATION SYSTEM, AND AN ASSOCIATED AIRCRAFT AND GEOLOCATION METHOD

CROSS-REFERENCE TO RELATED APPLICATIONS

This application claims priority to French patent application No. FR 1870221 filed on Mar. 1, 2018, the disclosure of which is incorporated in its entirety by reference herein.

BACKGROUND OF THE INVENTION

(1) Field of the Invention

The present invention relates to the field of geolocation, in particular geolocating aircraft. In addition, such aircraft may be aircraft of autonomous type, such as drones, without a pilot or crew on board. Such aircraft are generally referred to as unmanned aerial vehicles (UAVs).

(2) Description of Related Art

In general manner, numerous geolocation systems are known that are suitable for being used by aircraft such as drones. Such navigation systems may consist in particular in satellite positioning systems such as the system known by the acronym GPS for "global positioning system".

Nevertheless, a problem of reliability exists with such satellite positioning systems. Specifically, it is not in any way possible to obtain an undertaking from the proprietors of satellites concerning continuity in time of the supply of the signal transmission service performed by those satellites.

Furthermore, such signals transmitted by satellites generally make use of a very narrow frequency band, and indeed only two fixed and known frequencies of 1575.42 megahertz (MHz) and 1227.60 MHz, for the GPS system. In addition, those signals are not powerful and they can therefore easily be jammed on the ground, e.g. by an ill-intentioned person. Thus, in the presence of an active jammer in the proximity of an aircraft, it becomes impossible to use such a satellite geolocation system.

Furthermore, as described in Document US 2015/0130664, geolocating systems are also known in which an object transmits a signal received by various reception antennas arranged on the ground. Under such circumstances, analyzing the times between the signal being transmitted and being received by the various reception antennas makes it possible to determine a position for the object.

Nevertheless, such geolocation systems are particularly onerous to install, since, in order to be used, they require a large number of dedicated reception antennas to be provided and installed on the ground. In addition, an aircraft transmitting a signal is not compatible with certain missions carried out by aircraft, should maximum discretion be required.

Furthermore, Document US 2015/130664 relates to a geolocation system in which movable pieces of equipment, but not aircraft, are fitted with magnetic sensors. Such a document therefore does not describe a geolocation system that is suitable for aircraft.

In addition, Document US 2017/199269 discloses a geolocation system for a drone (140) having one or more reception antennas (146) for receiving signals transmitted by ground stations (110, 120, 130). Such a drone also includes an analysis unit (142) for determining the transmission directions from the ground stations, a memory (150) for storing the coordinates of the various stations, and calculation means for calculating the current coordinates of the drone.

Thus, such a drone has one or more reception antennas (146) of a common type or a combination of antennas and of transducers serving to identify the transmission directions of such signals by using two mutually distinct technologies.

Nevertheless, Document US 2017/199269 does not disclose a geolocation method including an analysis step for performing a phase-shift in which the radio signals received by a reception antenna are phase-shifted by 90°.

Such a geolocation method therefore does not facilitate identifying two directions in which radio signals are transmitted by generating distinct radiation patterns.

Document US 2016/018509 describes a drone fitted with a system for identifying the direction and the distance of a transmitter of electromagnetic waves. Such a drone then has an antenna that can be pivoted by an operator Nevertheless, Document US 2016/018509 does not disclose an analysis unit of the drone that is capable of phase-shifting in order to phase-shift the radio signals received by the reception antenna through 90°.

Document WO 2004/027446 discloses a geolocation system for an aircraft fitted with one or more reception antennas for receiving signals transmitted by ground beacons.

Nevertheless, like Document US 2017/199269, Document WO 2004/027446 does not disclose using an analysis unit that performs phase-shifting, thereby enabling the radio signals received by a reception antenna to be phase-shifted through 90°.

BRIEF SUMMARY OF THE INVENTION

An object of the present invention is thus to propose a geolocation system making it possible to overcome the above-mentioned limitations. Thus, the object of the invention is to provide a solution that is simple, reliable, and effective over time for geolocating and positioning an aircraft by determining in real time its coordinates in terms of latitude and longitude.

Another object of the invention is to avoid any potential jamming problems by using signals of high power over a broad frequency band.

Finally, another object of the invention is to provide a solution that is inexpensive and that makes it possible to avoid an aircraft needing to transmit any signal, so as to guarantee great discretion in the use of the aircraft.

The invention thus provides a geolocation system for calculating the current coordinates at least in longitude and in latitude of a current position of an aircraft.

Such a geolocation system comprises:

at least two mutually distinct ground stations suitable for transmitting radio signals at predetermined frequencies, such ground stations comprising a first ground station transmitting the radio signals at at least one first predetermined frequency and a second ground station transmitting the radio signals at at least one second predetermined frequency;

at least two reception antennas comprising a first reception antenna and a second reception antenna both suitable for receiving the radio signals;

an analysis unit for analyzing the radio signals, the analysis unit being connected to the reception antennas and serving to determine at least two transmission directions of the radio signals, such transmission directions comprising firstly a first transmission direction corresponding to a first straight line passing through the current position of the aircraft and also through the first ground station, and a second transmission direction corresponding to a second straight line passing through the current position of the aircraft and also through the second ground station;

a memory for containing all or part of a database including at least position data associating the first and second predetermined frequencies of the radio signals respectively with the first coordinates in latitude and in longitude of the first ground station and with the second coordinates in latitude and in longitude of the second ground station; and calculation means for calculating the current coordinates in latitude and in longitude corresponding to the current position of the aircraft firstly from the first and second coordinates in latitude and in longitude of the first and second ground stations and secondly from the first and second transmission directions of the radio signals.

According to the invention, such a geolocation system is remarkable in that the analysis unit for analyzing the radio signals performs a first phase shift through 90° of the radio signals received by the first reception antenna and then a second phase shift through 90° of the radio signals received by the second reception antenna.

In other words, such a geolocation system makes it possible to use radio signals transmitted by different radio stations transmitting at predetermined frequencies. Such first and second predetermined frequencies may be selected to be different from each other, however they could equally well be identical. Under such circumstances, another criterion for distinguishing between them may be used, such as for example analyzing the frequency modulation for each of the first and second predetermined frequencies corresponding respectively to at least two ground stations.

Furthermore, the radio signals may be transmitted over a wide frequency band, and consequently it is improbable that all of the frequencies of the transmitted radio signal will be jammed or subject to a transmission problem.

Also, the reception antennas are suitable for picking up predetermined frequencies in a frequency band to which the first and second predetermined frequencies belong.

Furthermore, the analysis unit serves both to identify the frequencies picked up by the reception antennas and to determine at least two transmission directions of the radio signals transmitted by at least two ground stations.

The calculation means perform mathematical calculations to determine the current coordinates in latitude and in longitude corresponding to the current position of the aircraft by calculating the coordinates of the point of intersection between the first and second straight lines corresponding to the two transmission directions of the radio signals and taking account of the first and second coordinates in latitude and in longitude of the first and second ground stations, as stored in the memory containing the database.

The analysis unit and the calculation means may in particular be formed respectively by computers, by processes, by integrated circuits, by programmable systems, and/or by logic circuits. Furthermore, the analysis unit and the calculation means may be formed by a single programmable assembly or by two mutually distinct programmable assemblies.

Advantageously, the reception antennas, the analysis unit, the memory, and the calculation means may be arranged on the aircraft Such an arrangement can thus make the aircraft autonomous, so that it can then determine in real time its current coordinates in latitude and in longitude and follow a predetermined route to a stored destination point.

In practice, and by way of example, the predetermined frequencies of the radio signals may be selected to lie within a frequency band reserved for commercial frequency-modulation broadcasting, the analysis unit serving to scan the frequency band in order to identify the predetermined frequencies.

The use of this frequency band thus makes it possible to make use of pre-existing ground stations, and consequently to have no need to deploy a network of ground stations for transmitting the radio signals. Also, such frequency modulation is a modulation technique that consists in transmitting a signal by modulating the frequency of a carrier signal.

In an advantageous embodiment of the invention, the predetermined frequencies of the radio signals may lie in a frequency band from 88 MHz to 108 MHz.

Such a frequency band is broad enough to provide a large number of predetermined frequencies corresponding to radio stations broadcasting music and/or news. In numerous countries, and in particular in Europe and in the United States, this frequency band corresponds to the frequency band used for commercial frequency modulation (FM) broadcasting.

Advantageously, the radio signals may comprise audio signals respectively associated in parallel with at least one service for transmitting digital data.

In other words, in order to ensure a predetermined frequency used by the geolocation system is identified securely, it is advantageous to make use of a service of the radio data system (RDS) type.

In practice, the reception antennas may be selected respectively from the group comprising antennas of the "quarter wave" type and antennas of the "half wave" type.

In other words and by way of example, each of the reception antennas may be constituted by an elongate element of length equal to one-fourth and/or to one-half of the wavelength of the radio signals. Such an elongate element is then arranged perpendicularly relative to a conductive plane for antennas of the quarter wave type or indeed on a side of the aircraft for antennas of the half wave type.

In an advantageous embodiment of the invention, the first reception antenna may scan a predetermined range of frequencies of radio signals and may identify the mutually distinct ground stations, and the second reception antenna may determine the transmission directions of the radio signals.

Such an arrangement thus makes it possible to associate those two reception antennas with different functions that are complementary. Thus, the first reception antenna serves to determine the frequency of the radio signals transmitted by the ground stations, while the second reception antenna serves to measure the strength of the radio signals, and thus the transmission directions of the ground stations.

In this specific situation, the second reception antenna may then be constituted by one or more directional antennas.

As mentioned above, the invention also provides an aircraft suitable for receiving radio signals at predetermined frequencies, the radio signals being transmitted by at least two ground stations comprising a first ground station transmitting the radio signals at at least one first predetermined frequency and a second ground station transmitting the radio signals at at least one second predetermined frequency.

Such an aircraft comprises:

at least two reception antennas comprising a first reception antenna and a second reception antenna respectively suitable for receiving the radio signals;

an analysis unit for analyzing the radio signals, the analysis unit being connected to the reception antennas and serving to determine at least two transmission directions of the radio signals, the transmission directions comprising firstly a first transmission direction corresponding to a first straight line passing through the current position of the aircraft and also through the first ground station, and a second transmission direction corresponding to a second straight line passing through the current position of the aircraft and also through the second ground station;

a memory for containing all or part of a database including at least position data associating the first and second predetermined frequencies of the radio signals respectively with the first coordinates in latitude and in longitude of the first ground station and with the second coordinates in latitude and in longitude of the second ground station; and calculation means for calculating the current coordinates in latitude and in longitude corresponding to the current position of the aircraft firstly from the first and second coordinates in latitude and in longitude of the first and second ground stations and secondly from the first and second transmission directions of the radio signals.

According to the invention, such an aircraft is remarkable in that the analysis unit for analyzing the radio signals performs a first phase shift through 90° of the radio signals received by the first reception antenna and then a second phase shift through 90° of the radio signals received by the second reception antenna.

Like the geolocation system, such an aircraft can thus pick up radio signals transmitted by different radio stations transmitting at predetermined frequencies. As before, the radio signals may be transmitted over a wide frequency band, and consequently it is improbable that all of the frequencies of the transmitted radio signal will be jammed or subject to a transmission problem.

Also, the reception antennas of the aircraft are suitable for picking up predetermined frequencies in a frequency band to which the first and second predetermined frequencies belong.

Furthermore, the analysis unit on board the aircraft serves both to identify the various frequencies picked up by the reception antennas and to determine at least two transmission directions of the radio signals transmitted by at least two ground stations.

Advantageously, the aircraft may include a navigation instrument serving to identify a travel direction of the aircraft relative to a reference direction in a horizontal plane containing the aircraft.

Such a navigation instrument thus serves to make the aircraft autonomous by allowing it to follow a predetermined heading. Knowing the current position of the aircraft and a destination position, the aircraft is therefore capable of navigating at least temporarily by following a direction delivered by the navigation instrument. Such a navigation instrument is then connected to a control member for controlling propulsion and/or lift means of the aircraft so as to enable such an aircraft to be controlled.

In practice, such a navigation instrument may be selected from the group comprising magnetic compasses, gyro compasses, electronic compasses, and satellite compasses.

Such compasses serve in particular to provide a solution that is simple, safe, and effective for enabling the aircraft to follow a predetermined heading.

Also, the reception antennas have a degree of freedom to move in rotation relative to a fixed airframe of the aircraft, and such an aircraft may include at least one motor enabling rotation of the at least one reception antenna to be driven about an axis of rotation Z', Z".

In other words, the reception antennas may turn about their own axes being driven in rotation by the motors, which may themselves be electric motors, for example. By way of example, arranging the reception antennas in this way with rotary motor drive can enable the analysis unit of the aircraft to facilitate identifying the transmission directions of the radio signals.

Otherwise, the antennas may be fixed, and it is the aircraft that turns about its own axis. It is even possible to avoid such turning by deriving a reception direction from the received signal by processing the received signal.

The invention also provides a geolocation method for calculating the current coordinates at least in longitude and in latitude of a current position of an aircraft.

Such a geolocation method comprises:

two steps of transmitting radio signals at predetermined frequencies respectively by at least two mutually distinct ground stations, the ground stations comprising a first ground station transmitting the radio signals at at least one first predetermined frequency, and a second ground station transmitting the radio signals at at least one second predetermined frequency;

a step of receiving the radio signals by at least two reception antennas comprising a first reception antenna and a second reception antenna;

an analysis step for analyzing the radio signals, the analysis step serving to determine at least two transmission directions of the radio signals, the transmission directions comprising firstly a first transmission direction corresponding to a first straight line passing through the current position of the aircraft and through the first ground station, and secondly a second transmission direction corresponding to a second straight line passing through the current position of the aircraft and also through the second ground station;

a storage step serving to store in a memory all or part of a database including at least position data associating the first and second predetermined frequencies of the radio signals respectively with first coordinates in latitude and in longitude of the first ground station and with the second coordinates in latitude and in longitude of the second ground station; and a calculation step serving to calculate the current coordinates in latitude and in longitude corresponding to the current position of the aircraft, firstly from the first and second coordinates in latitude and in longitude of the first and second ground stations, and secondly from the first and second transmission directions of the radio signals.

According to the invention, such a geolocation method is remarkable in that the analysis step includes a first phase-shifting substep consisting in phase shifting the radio signals received by a first reception antenna through 90°, followed by a second phase-shifting substep consisting in phase shifting the radio signals received by a second reception antenna through 90°.

In other words, such a geolocation method includes a reception step for picking up radio signals transmitted by different radio stations transmitting at predetermined frequencies. Furthermore, the radio signals may be transmitted over a wide frequency band, and consequently it is improbable that all of the frequencies of the transmitted radio signal will be jammed or subject to a transmission problem.

Also, the reception step is performed by the reception antennas picking up predetermined frequencies in a frequency band to which the first and second predetermined frequencies belong.

Furthermore, the analysis step serves both to identify the various frequencies picked up by the reception antennas and to determine at least two transmission directions of the radio signals transmitted by at least two ground stations.

Such phase-shifting substeps serve in particular to generate two distinct radiation patterns that make it possible to determine the first and second transmission directions of the radio signals.

In practice, the analysis step may include a rotation substep for rotating the first and second reception antennas enabling a radiation pattern to be generated presenting two cardioids representative of the maximum amplitudes of the radio signals received respectively by each of the first and second antennas, a transmission direction of the radio signals being identified when the two cardioids are symmetrical about an ordinate axis Y of the radiation pattern.

Thus, rotating the first and second reception antennas serves to obtain radiation patterns in the form of cardioids for each of the first and second reception antennas. Analyzing the shape, the orientation, and the size of each of the two cardioids in each radiation pattern then serves to determine the transmission directions of the radio signals.

Specifically, the two radiation patterns may present cardioids shapes for each of the radio signals received by the first and second reception antennas. When the received radio signals present the same levels in each of the cardioids, the direction of a transmitter station lies in a vertical plane perpendicular to a reception plane formed by the two reception antennas. Such a reception plane is then determined as being the plane containing the middles of the first and second reception antennas. The transmission direction of each of the electromagnetic signals is then determined by a straight line marking the intersection between the vertical plane perpendicular to the reception plane and a horizontal plane.

Under such circumstances, the phase shifting through 90° may be associated with one of the two antennas and then with the other, thus making it possible to generate two distinct radiation patterns in succession. For a given transmission station, by measuring the level of the signals received successively in the two configurations that give rise to these two radiation patterns, it is easy, by positioning the two reception antennas at the front or at the rear of the aircraft, to determine whether the transmission station is arranged to the right or to the left of a longitudinal direction of the aircraft extending between a rear face and a front face of the aircraft.

Thereafter, either by calculation or by causing the two reception antennas to turn relative to the ground, it is possible to determine the transmission direction of the transmission station.

Thus, in a first implementation of the invention, the rotation substep for rotating the first and second reception antennas may be performed by causing the aircraft to turn about a vertical axis Z passing through a geometrical center of the aircraft.

In this first example, the first and second reception antennas may be arranged in a fixed manner relative to an airframe of the aircraft. In other words, the first and second reception antennas may be subjected to an embedded type connection with the airframe of the aircraft, and by way of example they may be installed on the sides of the aircraft.

In a second implementation of the invention, each of the first and second reception antennas includes a respective degree of freedom to move in rotation relative to a fixed airframe of the aircraft, and the rotation substep may be performed by using at least one motor to drive each reception antenna to rotate about an axis of rotation Z', Z''.

Thus, in this second example, the first and second reception antennas can revolve relative to the airframe of the aircraft about respective axes of rotation Z', Z''.

BRIEF DESCRIPTION OF THE DRAWINGS

The invention and its advantages appear in greater detail from the context of the following description of examples given by way of illustration and with reference to the accompanying figures, in which.

Elements present in more than one of the figures are given the same references in each of them.

DETAILED DESCRIPTION OF THE INVENTION

As mentioned above, the invention relates to a geolocation system, to an aircraft, and to a geolocation method serving to calculate the current coordinates at least in terms of longitude and latitude for the current position of an aircraft.

Figure 1:
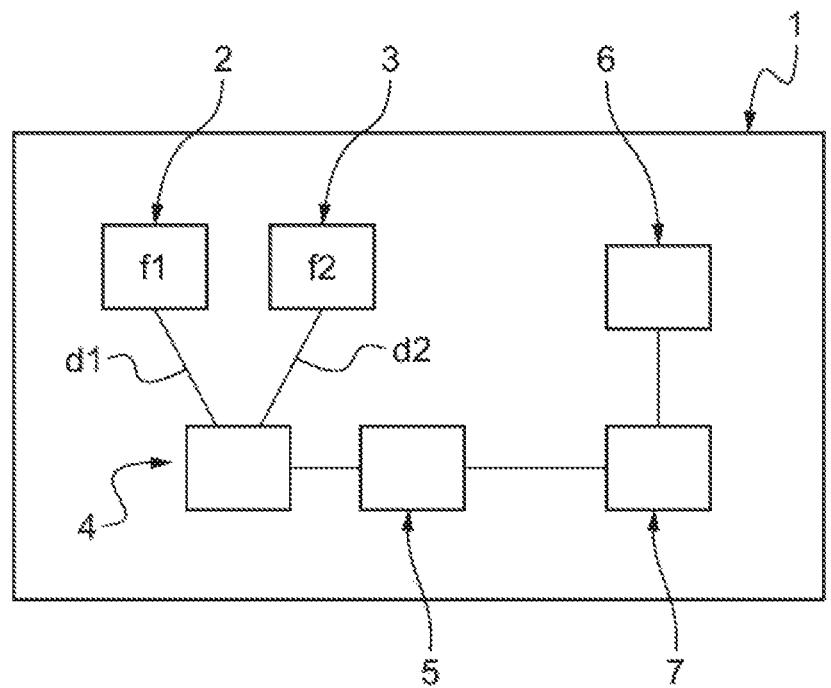
FIG. 1 is a block diagram showing a geolocation system in accordance with the invention.

As shown in FIG. 1, such a geolocation system 1 thus includes at least two distinct ground stations 2 and 3 that are located at mutually distinct positions on the ground surface. Such ground stations 2 and 3 may optionally be preexisting stations and they serve to transmit radio signals at predetermined frequencies f1 and f2 that may be distinct from each other, but need not necessarily be distinct. Specifically, it is possible to envisage other ways of distinguishing the ground stations 2 and 3, e.g. by analyzing modulation corresponding to the respective transmitted radio signals.

In addition, in a particular embodiment, such ground stations 2 and 3 may be formed by pre-existing stations for broadcasting music, news, or programs. The predetermined frequencies f1 and f2 for the radio signals may thus be selected to lie in a frequency band that is reserved for commercial frequency modulation broadcasting, and may for example lie in a frequency band in the range 88 MHz to 108 MHz.

Furthermore, such a geolocation system 1 also has at least two reception antennas 4 and 4' for receiving the radio signals, and an analysis unit 5 connected to the reception antennas 4 and 4'. The analysis unit 5 thus serves to analyze the received radio signals in order to determine the respective transmission directions d1 and d2 of the ground stations 2 and 3 and thus their positions relative to the reception antennas 4 and 4' arranged on the aircraft.

In addition, such a geolocation system 1 also has a memory 6 suitable for storing a database representing the coordinates in latitude and in longitude of the ground stations 2 and 3 associated respectively with the predetermined frequencies f1 and f2 of the radio signals that they transmit.

Finally, the geolocation system includes calculation means 7 connected both to the memory 6 and to the analysis unit 5 in order to calculate the current coordinates of the aircraft. Such a calculation is performed on the basis firstly of first and second coordinates in latitude and in longitude of the two ground stations 2 and 3, and secondly of the two transmission directions d1 and d2 of the radio signals.

In addition, the analysis unit 5 and the calculation means 7 may in particular be formed respectively by computers, by processors, by integrated circuits, by programmable systems, and/or by logic circuits. Furthermore, the analysis unit 5 and the calculation means 7 may comprise a single unit, or they may be separate from each other.

Figure 2:
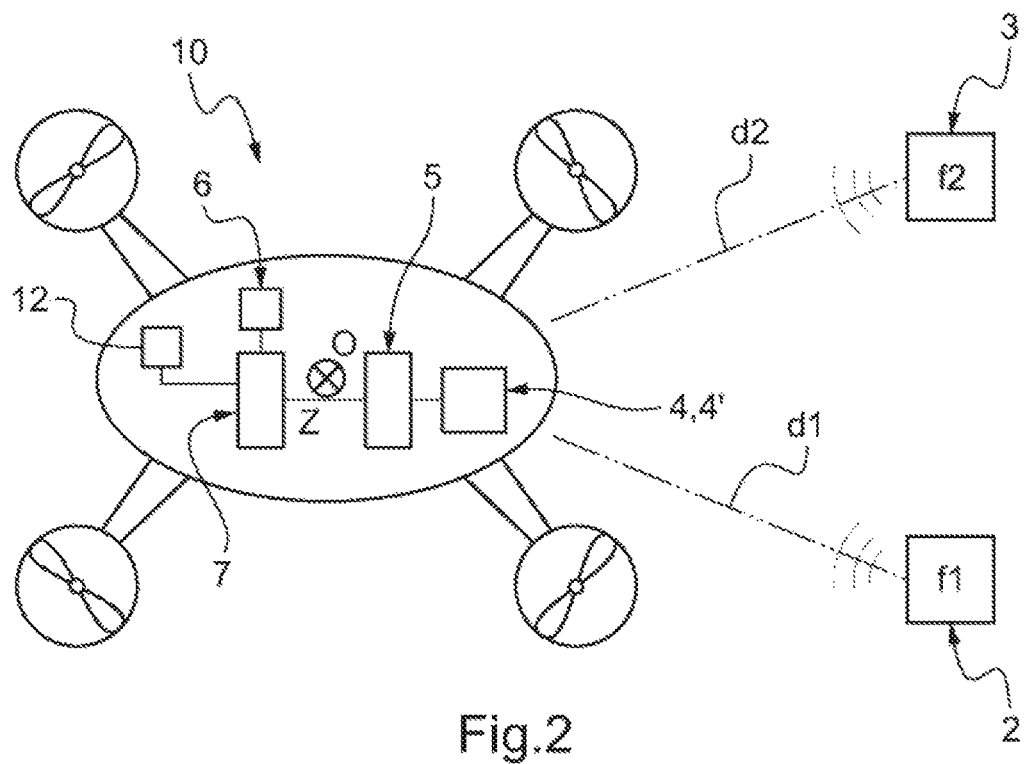
FIG. 2 is a plan view of a first embodiment of an aircraft in accordance with the invention.
Figure 3:
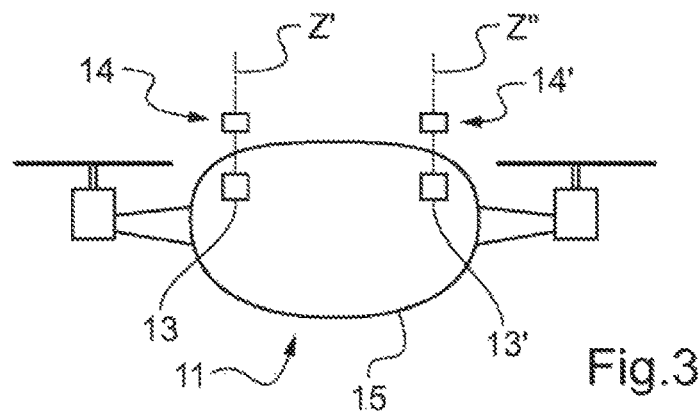
FIG. 3 is a face view of a second embodiment of an aircraft in accordance with the invention.

As shown in FIGS. 2 and 3, the invention also relates to an aircraft 10, 11.

Thus, in a first embodiment of an aircraft 10 as shown in FIG. 2, the two reception antennas 4 and 4' may be arranged in fixed and unidirectional manner on the aircraft 10. In this first embodiment, the aircraft 10 may then be suitable for pivoting about a virtual axis Z passing through a geometrical center O of the aircraft 10. By way of example, such an aircraft 10 may be formed by a rotorcraft (not shown) or by a multirotor type drone, for example, and as shown.

Such an aircraft 10 may thus have an airframe carrying two reception antennas 4 and 4', an analysis unit 5, a memory 6, and calculation means 7 as described above for the geolocation system 1.

The aircraft 10 may also include a navigation instrument 12, e.g. in order to enable the aircraft 10 to be controlled autonomously. Specifically, by knowing the coordinates of the current position of the aircraft and the coordinates of a destination, it is possible to control the path followed by the aircraft 10 automatically.

As shown in FIG. 3, a second embodiment of the aircraft 11 may consist in a drone having a fixed airframe 15 having two reception antennas 14 and 14' arranged thereon, each having a degree of freedom to rotate about a respective axis Z', Z" relative to the fixed airframe 15. Such reception antennas 14, 14' can then be rotated by respective motors 13, 13', which are advantageously electric motors.

Figure 4:
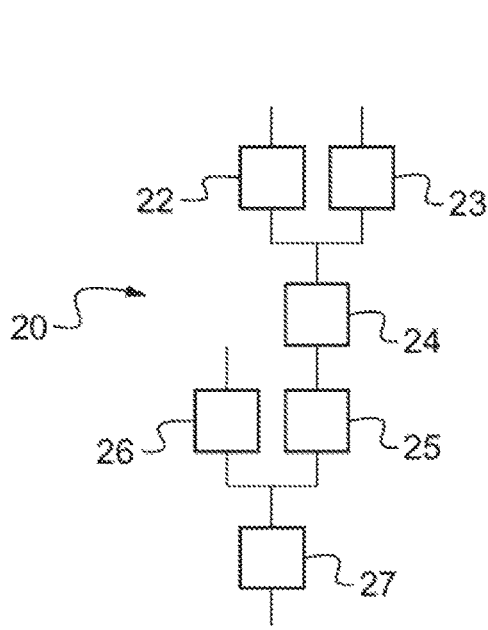
FIGS. 4 and 5 are two flow charts showing two variants of geolocation methods in accordance with the invention.
Figure 5:
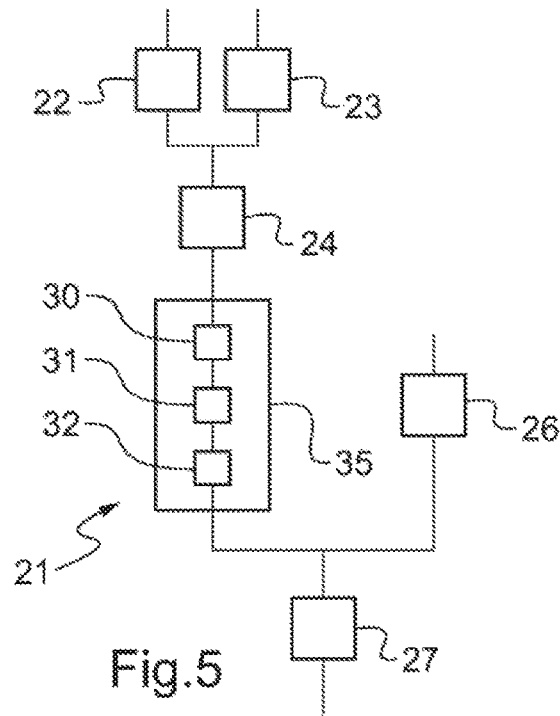

In addition, the two embodiments of an aircraft 10 and 11 both have two reception antennas serving respectively to measure one of the characteristics of the received radio signals, e.g. such as its maximum amplitude, and consequently to identify the two transmission directions d1 and d2 of the radio signals;

As shown in FIGS. 4 and 5, the invention also provides methods 20, 21 of geolocating an aircraft 10, 11.

Each of such geolocation methods 20, 21 thus comprises two steps 22, 23 of transmitting radio signals at respective predetermined frequencies f1, f2 by means of at least two mutually distinct ground stations 2, 3. Thereafter, these geolocation methods 20, 21 include a step 24 of receiving the radio signals by at least two reception antennas 4, 4', 14, 14'.

Thereafter, the geolocation methods 20, 21 include a step 25, 35 of analyzing the radio signals in order to determine at least two transmission directions d1, d2 of the radio signals.

As shown in FIG. 5, such an analysis step 35 may include a first phase-shifting substep 30 for phase-shifting the radio signals received by a first reception antenna 4, 14 temporarily through 90°, followed by a second phase-shifting substep 31 for phase-shifting the radio signals received by a second reception antenna 4', 14' temporarily through 90°.

As mentioned above, the analysis step 35 may then include a substep 32 of rotating the first and second reception antennas 4, 14 and 4', 14' so as to be able to measure and identify the maximum amplitudes of the radio signals received by each of the first and second antennas 4, 14 and 4', 14'.

Thus, by measuring the amplitude of the radio signals in this way, the analysis step 35 enables the two transmission directions d1 and d2 of the radio signals to be determined.

Furthermore, the geolocation methods 20 and 21 include a step 26 of storing an at least partial database in a memory 6, the database comprising position data associating predetermined frequencies f1 and f2 of the radio signals with respective first coordinates in latitude and in longitude for the first ground station 2 and second coordinates in latitude and in longitude for the second ground station 3.

Finally, the geolocation methods 20, 21 include a calculation step 27 for calculating the current coordinates in latitude and in longitude that correspond to the current position of the aircraft 10, 11. Such a calculation step 27 is thus performed firstly on the basis of the coordinates in latitude and in longitude of the two ground stations 2 and 3, and secondly on the basis of the transmission directions d1 and d2 of the radio signals as determined by the analysis step 25, 35.

Figure 6:
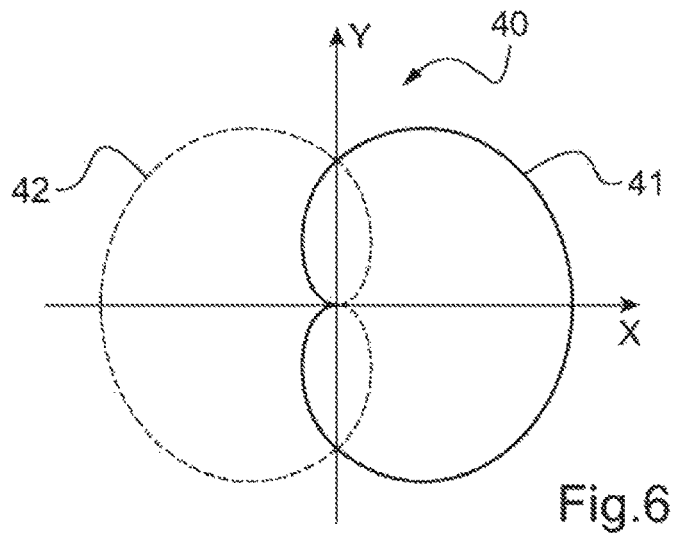
FIG. 6 is a diagram showing the amplitudes of the radio signals received in accordance with the invention.

Finally, as shown in FIG. 6, the analysis step 35 serves to identify one after the other the two transmission directions d1 and d2 of the radio signals. These transmission directions may be obtained by superposing on a single radiation pattern 40 two cardioides 41 and 42 representative of maximum amplitudes of the radio signals received respectively by each of the two reception antennas 4, 14, and 4', 14' during rotation that modifies the angular orientation of the reception antennas 4, 14 and 4', 14' relative firstly to the first ground station 2 and consequently to the second ground station 3. It should be observed that other radiation pattern shapes are possible as are other antenna configurations, such as for example using a single directional antenna.

On such a pattern 40, and assuming that both antennas are mounted at the front of the aircraft, the abscissa axis X corresponds to a transverse direction of the aircraft extending transversely between a left side and a right side of the aircraft, and the ordinate axis Y corresponds to a longitudinal direction of the aircraft extending transversely from a rear face to a front face of the aircraft.

Thus, the first cardioide 41 or the like may for example correspond to the radiation pattern of the array constituted by the two reception antennas 4, 14 and 4', 14' after applying a phase-shift of 90° to one of those two antennas 4, 14. The second cardioide 42 or the like, may be obtained by applying the phase-shift to the second antenna 4', 14'.

The analysis step 35 identifies one after another each of the two transmission directions d1 and d2 of the radio signals when, for each transmission direction d1, d2, both cardioides 41 and 42 are arranged symmetrically relative to the ordinate axis Y of the pattern 40.

Naturally, the present invention may be subjected to numerous variations as to its implementation. Although several embodiments are described, it can readily be understood that it is not conceivable to identify exhaustively all possible embodiments. It is naturally possible to envisage replacing any of the means described by equivalent means without going beyond the ambit of the present invention.

What is claimed is:

1. A geolocation system for calculating the current coordinates at least in longitude and in latitude of the current position of an aircraft, the geolocation system comprising:
at least two mutually distinct ground stations suitable for transmitting radio signals at predetermined frequencies, such ground stations comprising a first ground station transmitting the radio signals at at least one first predetermined frequency and a second ground station transmitting the radio signals at at least one second predetermined frequency;
at least two reception antennas comprising a first reception antenna and a second reception antenna both suitable for receiving the radio signals, the at least two reception antennas having a degree of freedom to move in rotation relative to a fixed airframe of the aircraft;

an analysis unit for analyzing the radio signals, the analysis unit being connected to the reception antennas and serving to determine at least two transmission directions of the radio signals, such transmission directions comprising firstly a first transmission direction corresponding to a first straight line passing through the current position of the aircraft and also through the first ground station, and a second transmission direction corresponding to a second straight line passing through the current position of the aircraft and also through the second ground station;

a memory for containing all or part of a database including at least position data associating the first and second predetermined frequencies of the radio signals respectively with first coordinates in latitude and in longitude of the first ground station and with the second coordinates in latitude and in longitude of the second ground station; and calculation means for calculating the current coordinates in latitude and in longitude corresponding to the current position of the aircraft firstly from the first and second coordinates in latitude and in longitude of the first and second ground stations and secondly from the first and second transmission directions of the radio signals;

the analysis unit for analyzing the radio signals performing a first phase shift through 90° of the radio signals received by the first reception antenna and then a second phase shift through 90° of the radio signals received by the second reception antenna, wherein a rotation of the first and second reception antennas enabling a radiation pattern to be generated presenting two cardioids representative of the maximum amplitudes of the radio signals received respectively by each of the first and second antennas, a transmission direction of the transmission directions of the radio signals being identified when the two cardioids are symmetrical about an ordinate axis Y of the radiation pattern.

2. The system according to claim 1, wherein the reception antennas, the analysis unit, the memory, and the calculation means are arranged on the aircraft.

3. The system according to claim 1, wherein the predetermined frequencies of the radio signals are selected to lie within a frequency band reserved for commercial frequency-modulation broadcasting, the analysis unit serving to scan the frequency band in order to identify the predetermined frequencies.

4. The system according to claim 3, wherein the predetermined frequencies of the radio signals lie in a frequency band from 88 MHz to 108 MHz.

5. The system according to claim 1, wherein the radio signals comprise audio signals respectively associated in parallel with at least one service for transmitting digital data.

6. The system according to claim 1, wherein the reception antennas are selected respectively from the group comprising antennas of the "quarter wave" type and antennas of the "half wave" type.

7. The system according to claim 1, wherein the first reception antenna scans a predetermined range of frequencies of radio signals and identifies the mutually distinct ground stations, and the second reception antenna determines the transmission directions of the radio signals.

8. An aircraft suitable for receiving radio signals at predetermined frequencies, the radio signals being transmitted by at least two ground stations comprising a first ground station transmitting the radio signals at at least one first predetermined frequency and a second ground station transmitting the radio signals at at least one second predetermined frequency, the aircraft comprising:

at least two reception antennas comprising a first reception antenna and a second reception antenna respectively suitable for receiving the radio signals;

an analysis unit for analyzing the radio signals, the analysis unit being connected to the reception antennas and serving to determine at least two transmission directions of the radio signals, the transmission directions comprising firstly a first transmission direction corresponding to a first straight line passing through the current position of the aircraft and also through the first ground station, and a second transmission direction corresponding to a second straight line passing through the current position of the aircraft and also through the second ground station;

a memory for containing all or part of a database including at least position data associating the first and second predetermined frequencies of the radio signals respectively with the first coordinates in latitude and in longitude of the first ground station and with the second coordinates in latitude and in longitude of the second ground station; and calculation means for calculating the current coordinates in latitude and in longitude corresponding to the current position of the aircraft firstly from the first and second coordinates in latitude and in longitude of the first and second ground stations, and secondly from the first and second transmission directions of the radio signals;

the analysis unit for analyzing the radio signals performing a first phase shift through 90° of the radio signals received by the first reception antenna and then a second phase shift through 90° of the radio signals received by the second reception antenna, wherein a rotation of the first and second reception antennas enabling a radiation pattern to be generated presenting two cardioids representative of the maximum amplitudes of the radio signals received respectively by each of the first and second antennas, a transmission direction of the transmission directions of the radio signals being identified when the two cardioids are symmetrical about an ordinate axis Y of the radiation pattern.

9. The aircraft according to claim 8, wherein the aircraft includes a navigation instrument serving to identify a travel direction of the aircraft relative to a reference direction in a horizontal plane containing the aircraft.

10. The aircraft according to claim 9, wherein the navigation instrument is selected from the group comprising magnetic compasses, gyro compasses, electronic compasses, and satellite compasses.

11. The aircraft according to claim 8, wherein the at least one reception antenna has a degree of freedom to move in rotation relative to a fixed airframe of the aircraft, and the aircraft includes at least one motor enabling rotation of the at least one reception antenna to be driven about an axis of rotation.

12. A geolocation method for calculating the current coordinates at least in longitude and in latitude of a current position of an aircraft, the geolocation method comprising:

two steps of transmitting radio signals at predetermined frequencies respectively by at least two mutually distinct ground stations, the ground stations comprising a first ground station transmitting the radio signals at at least one first predetermined frequency, and a second ground station transmitting the radio signals at at least one second predetermined frequency;

a step of receiving the radio signals by at least two reception antennas comprising a first reception antenna and a second reception antenna;

an analysis step for analyzing the radio signals, the analysis step serving to determine at least two transmission directions of the radio signals, the transmission directions comprising firstly a first transmission direction corresponding to a first straight line passing through the current position of the aircraft and through the first ground station, and secondly a second transmission direction corresponding to a second straight line passing through the current position of the aircraft and also through the second ground station;

a storage step serving to store in a memory all or part of a database including at least position data associating the first and second predetermined frequencies of the radio signals respectively with first coordinates in latitude and in longitude of the first ground station and with the second coordinates in latitude and in longitude of the second ground station; and a calculation step serving to calculate the current coordinates in latitude and in longitude corresponding to the current position of the aircraft, firstly from the first and second coordinates in latitude and in longitude of the first and second ground stations, and secondly from the first and second transmission directions of the radio signals;

the analysis step including a first phase-shifting substep consisting in phase shifting the radio signals received by the first reception antenna through 90°, followed by a second phase-shifting substep consisting in phase shifting the radio signals received by the second reception antenna through 90°, the analysis step includes a rotation substep for rotating the first and second reception antennas enabling a radiation pattern to be generated presenting two cardioids representative of the maximum amplitudes of the radio signals received respectively by each of the first and second antennas, a transmission direction of the transmission directions of the radio signals being identified when the two cardioids are symmetrical about an ordinate axis Y of the radiation pattern.

13. The method according to claim 12, wherein the rotation substep for rotating the first and second reception antennas is performed by causing the aircraft to turn about a vertical axis Z passing through a geometrical center of the aircraft.

14. The method according to claim 12, wherein each of the first and second reception antennas includes a respective degree of freedom to move in rotation relative to a fixed airframe of the aircraft, and the rotation substep is performed by using at least one motor to drive each reception antenna to rotate about an axis of rotation Z', Z''.

* * * * *